F. A. STEVENS.
SPECTACLES.
APPLICATION FILED OCT. 13, 1911.
1,043,270.
Patented Nov. 5, 1912.
2 SHEETS—SHEET 1.
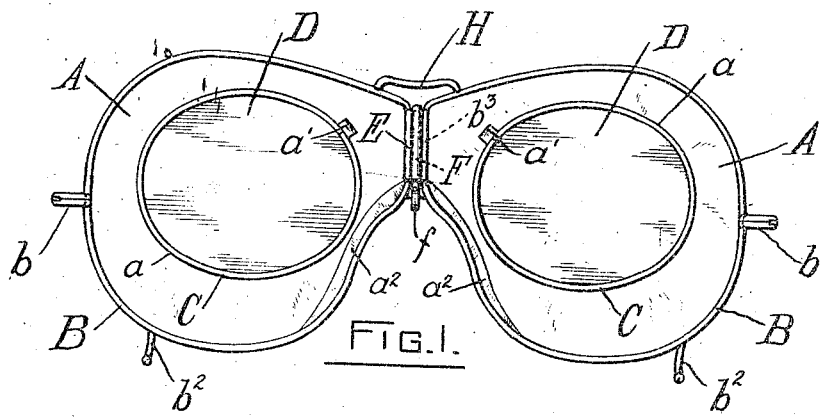
Fig. 1.
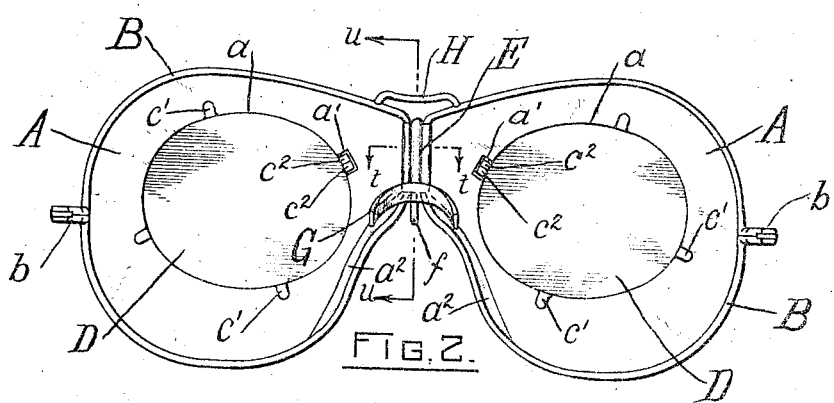
Fig. 2.
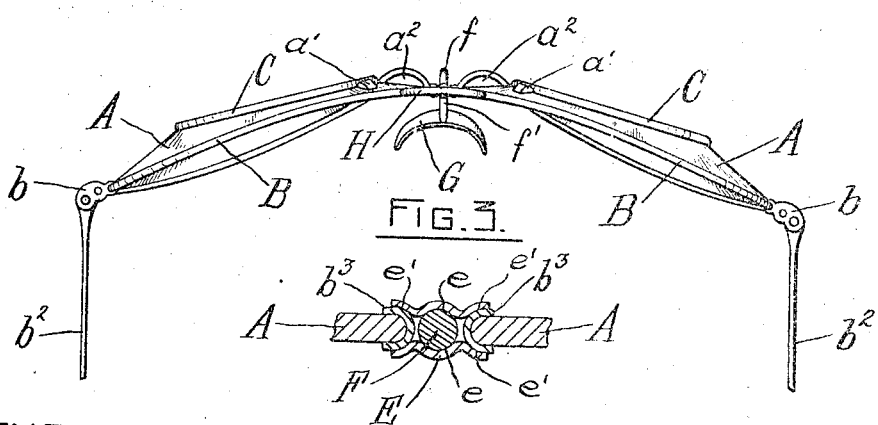
Fig. 3.
Fig. 4.
WITNESSES.
Albert J. Purzenthowski
Anna C. Pearson
INVENTOR.
Frederick A. Stevens
By Horatio E. Bellows
ATTORNEY.

F. A. STEVENS.
SPECTACLES.
APPLICATION FILED OCT. 13, 1911.
1,043,270.
Patented Nov. 5, 1912.
2 SHEETS—SHEET 2.
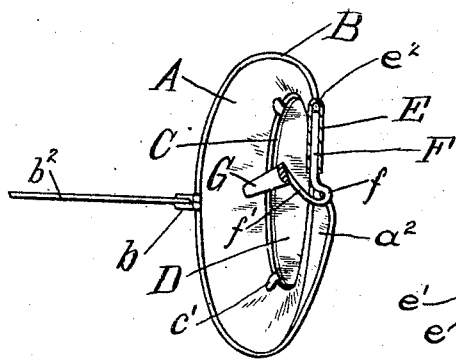
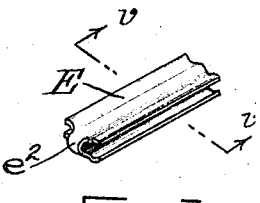
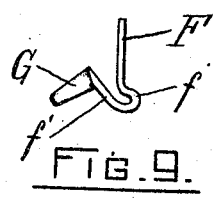
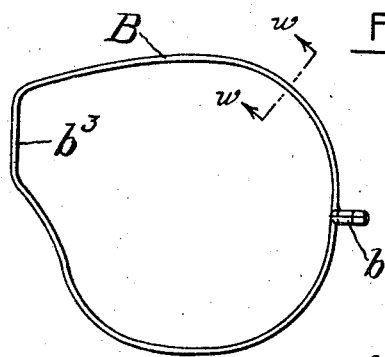
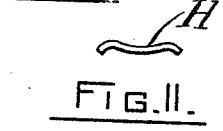
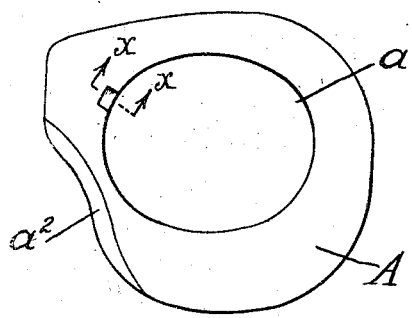
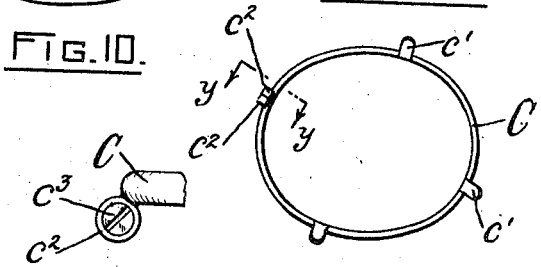
WITNESSES.
Albert J. Puzynthowski
Anna E. Reardon
INVENTOR.
Frederick A. Stevens
By Horatio E. Bellows
ATTORNEY.

UNITED STATES PATENT OFFICE.

FREDERICK A. STEVENS, OF PROVIDENCE, RHODE ISLAND.

SPECTACLES.

1,043,270.

Specification of Letters Patent.

Patented Nov. 5, 1912.

Application filed October 13, 1911. Serial No. 654,543.

*To all whom it may concern:*

Be it known that I, FREDERICK A. STEVENS, a citizen of the United States, residing at Providence, in the county of Providence and State of Rhode Island, have invented certain new and useful Improvements in Spectacles, of which the following is a specification.

My invention relates to spectacles and has for its essential objects, protection against dust, dirt and wind; to afford substitution of focal or other lenses to correct any visual defect without the necessity of regrinding; to maintain the lenses in definite original position which is essential in case of such visual defects as astigmatism; to render the connection between the shield and lenses inconspicuous; to locate the shield as closely to the nose as possible; to afford an inconspicuous rest upon the nose; to permit universal adjustment of the spectacles relatively to the face or to the pupillary distance; to minimize the use of solder in the construction of the parts; and to render the entire structure strong, simple, and inexpensive.

To the above ends my invention consists in such parts and combinations of parts as fall within the scope of the appended claims.

In the accompanying drawings which form a part of this specification, Figures 1, 2, and 3, are front, rear, and top plan elevations respectively of my novel spectacles, Fig. 4, a section on line $t\ t$ of Fig. 2, Fig. 5, a section on line $u\ u$ of Fig. 2, Figs. 6, and 7, perspective views of the connecting member of the shields in various degrees of completion. Fig. 8, a section on line $v\ v$ of Fig. 7, Figs. 9, 10, and 11, detail views of the nose rest, outer rim and brace respectively. Fig. 12, a section on line $w\ w$ of Fig. 10, Fig. 13, a rear elevation of one of the shields, Fig. 14, a section on line $x\ x$ of Fig. 13, Fig. 15, a rear elevation of an inner rim, Fig. 16, a view taken on line $y\ y$ of Fig. 15, and Fig. 17, a detail view of one of the ears.

Like reference characters indicate like parts throughout the views.

My spectacles in their present embodiment comprise shields A of aluminum or other light material, preferably opaque or translucent in character, and adapted to protect the eyes from dust and wind. These shields may be of any preferred shape and in the present instance are nearly elliptical in outline, and are provided with visual openings $a$ intended to receive lenses. In the margin of each opening is a cavity $a'$ impressed or indented in the rear face of each plate. Each plate is generally concavo-convex except that portions of the outer margins below the point of connection of the two plates are outwardly bent presenting in profile a reverse curve and forming bearing flanges $a^2$ adapted to rest against the sides of the nose. It will, however, be understood that the plates A may be employed without bearing flanges, but these have been found to lessen the ingress of dust by permitting a closer fit to the nose surface. The plates A are each inclosed in a grooved rim B of usual construction provided at their outer joints with the usual ears $b$ in which are pivoted the temples $b^2$. A portion of the rim B nearly opposite the rim joint as at $b^3$ is straight. Around each opening $a$, against the front face of the shield A, is located a removable rim C provided with an internal annular groove $c$, and having at intervals along its rear edge lateral bendable ears $c'$ which are adapted to be inwardly bent over the margin of the opening and against the rear face of the plate A, thus firmly holding the rim in position. At the contiguous ends of each rim C, are perforated lugs $c^2$, connected by a screw $c^3$ which register in the cavity $a'$ and are thus concealed from view from the front and assist in preventing any accidental annular movement of the rim.

Each rim C has located in the groove $c$ a lens D which is inserted into the rim before the latter is mounted in the shield A. The lens may be either plano-focus or cylindrical. And in case the latter form of lens is employed any possible derangement of the axis is obviated by reason of the described connection of the rim C with the shield A. Yet it will be noted that the character of the connection is such that the lenses may be readily changed without materially disassembling the spectacle parts.

The shields may be integral with each other, but, I have herein shown them in two parts connected together by an intermediate member E. This is preferably constructed by cutting and forming from a flat sheet of metal an oblong blank as shown in Fig. 6 provided with three longitudinally disposed corrugations, namely, a central groove $e$, and side grooves $e'$. The blank has also a reduced central portion $e^2$ contiguous with the groove, and is bent or folded midway its length bringing the remainder of the blank and the grooves into parallelism, as shown in Figs. 7 and 8. The portions $b^3$ of the rims B are inserted into the grooves $e'$ from the open sides of the blank E.

A nose rest is provided comprising a vertical rod F having at its lower portion a substantially horizontal forwardly extending loop $f$, and extending thence rearwardly and upwardly forming an arm $f'$ to whose end is fixed an arched nose rest G. The rod F is inserted into the groove $e$ whose upper end is closed by the loop $e^2$ which completes the substantial tube formed by the grooves $e$. After the rod F and the portions $b^3$ of the rims have been assembled in their respective grooves as above described the opposite portions of the blank E are by proper tools swaged down into tubes. The loop $f$ and the arm $f'$ afford means for universal adjustment of the spectacles toward and away from the planes of the lenses, up and down, right and left, and otherwise, and the nose rest G is concealed by the shield. In this instance the connection of the shields to each other is strengthened by a brace H fixed at its ends to the top of the rim B.

What I claim is—

1. In spectacles, the combination of a shield provided with visual openings, and outwardly bent nose bearing portions upon the margin of the shield.

2. In spectacles, the combination of a shield provided with visual openings, grooved rims upon the margins of the openings, lenses in the grooved rims, and ears upon the rims engaging the shield.

3. In spectacles, the combination of a shield provided with visual openings, and with marginal cavities, rims removably mounted in the openings, lenses seated in the grooved rims, and lugs upon the rims registering in the cavities.

4. In spectacles, the combination of a concavo-convex shield provided with visual openings and with outwardly bent nose bearing portions, rims removably mounted in the openings, and lenses mounted in the rims.

5. In spectacles, the combination of a shield provided with visual openings, a rim engaging the outer edges of the shield, rims removably mounted in the openings, and lenses in the last mentioned rims.

6. In spectacles, the combination of a shield provided with visual openings, lenses, means for attaching the lenses to the shield over the openings, a nose rest, and an arm fixed to the nose rest and provided with a loop connected with an intermediate portion of the shield.

7. In spectacles, the combination of a shield comprising two stiff opaque or translucent members provided with visual openings, rims upon the outer edges of the members, a member provided with lateral tubular portions in which the first mentioned members are seated, and provided with an intermediate tubular portion, a rod located in the last mentioned portion, a nose rest, an arm integral with the rod fixed to the nose rest, and lenses mounted in the visual openings.

8. In spectacles, the combination of a shield comprising two members provided with visual openings, rims upon the outer edges of the members, a brace connecting the rims, a member connecting the rims below the brace, a nose rest, an arm connecting the nose rest with the last mentioned connecting member, and lenses mounted in the visual openings.

9. In spectacles the combination of a shield comprising two members provided with visual openings, rims upon the outer edges of the members, a member connecting the rims, a nose rest in the rear of the shield members, and an arm provided with a fold connecting the nose rest and the connecting member.

10. In spectacles, the combination of a shield provided with visual openings and with nose bearing portions having reversely curved margins, rims mounted in the openings, and lenses mounted in the rims.

In testimony whereof I have affixed my signature in presence of two witnesses.

FREDERICK A. STEVENS.

Witnesses:
　CLIFFORD S. TOWER,
　HORATIO E. BELLOWS.